Nov. 15, 1960 V. G. KLEIN 2,960,185
LUBRICATING APPARATUS
Filed Jan. 30, 1959 4 Sheets-Sheet 1

Victor G. Klein,
Inventor.
Koenig and Pope,
Attorneys.

Nov. 15, 1960   V. G. KLEIN   2,960,185
LUBRICATING APPARATUS
Filed Jan. 30, 1959   4 Sheets-Sheet 2
FIG. 3.
FIG. 6.
FIG. 8.
FIG. 7.
Victor G. Klein,
Inventor.
Koenig and Pope,
Attorneys.
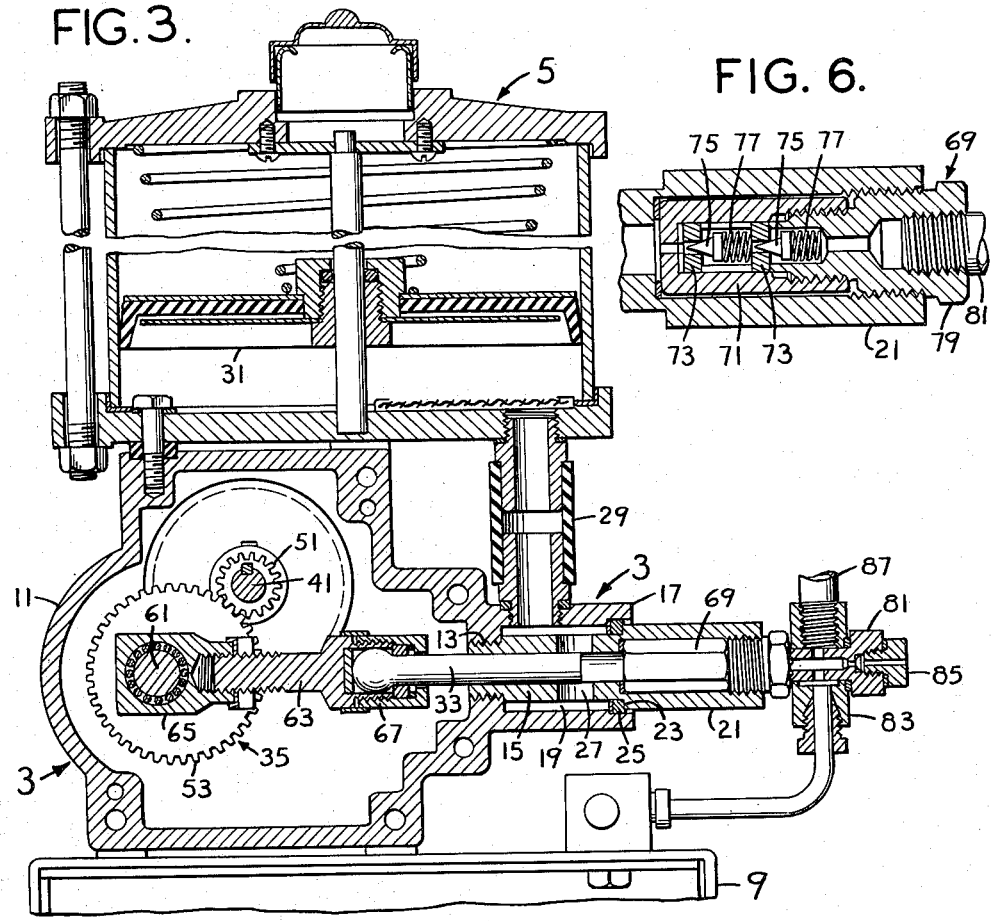
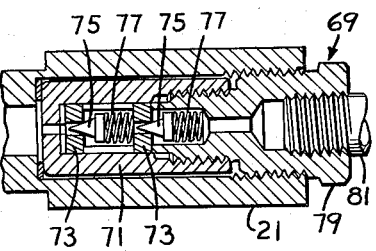
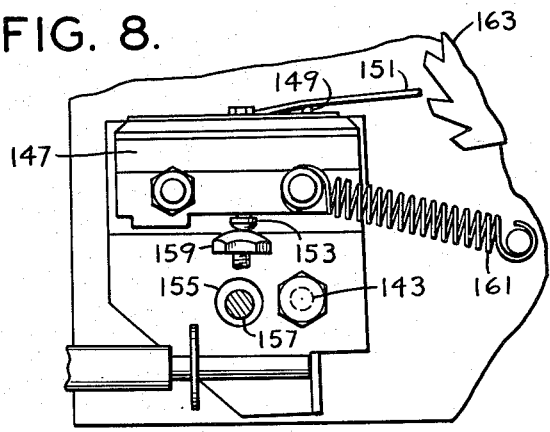
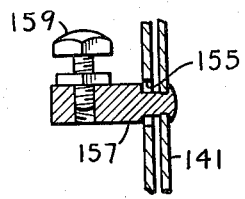

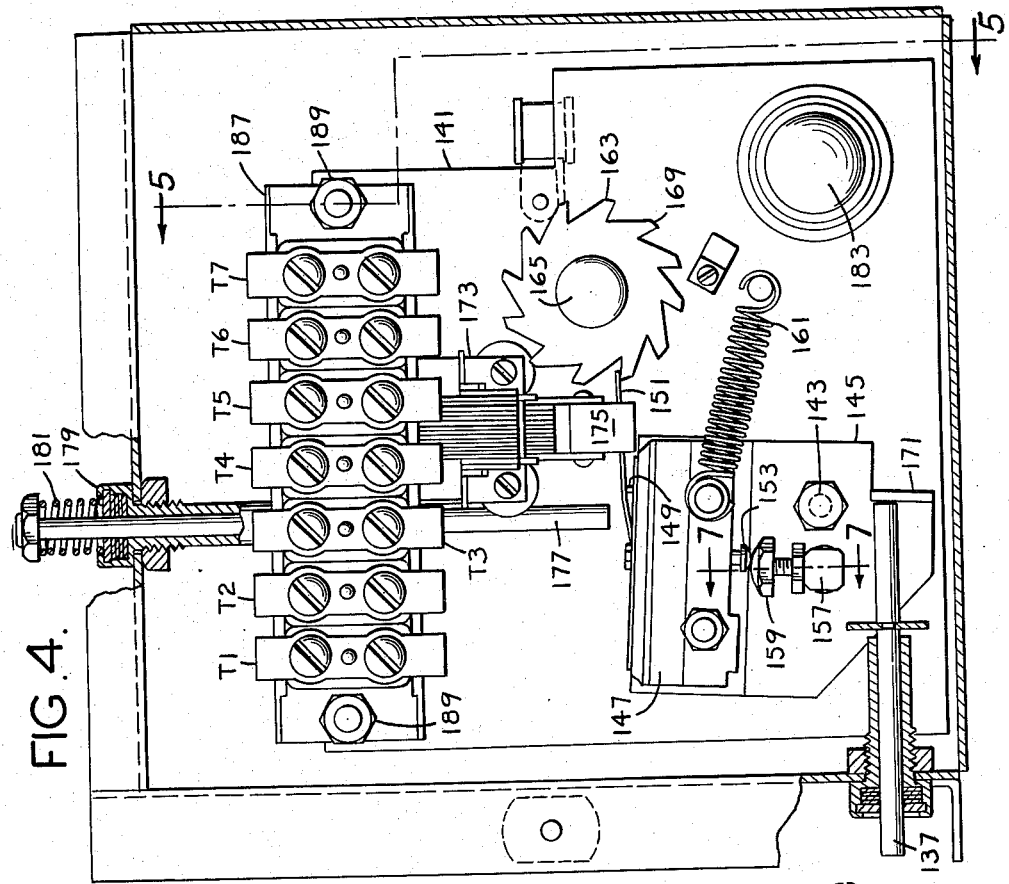
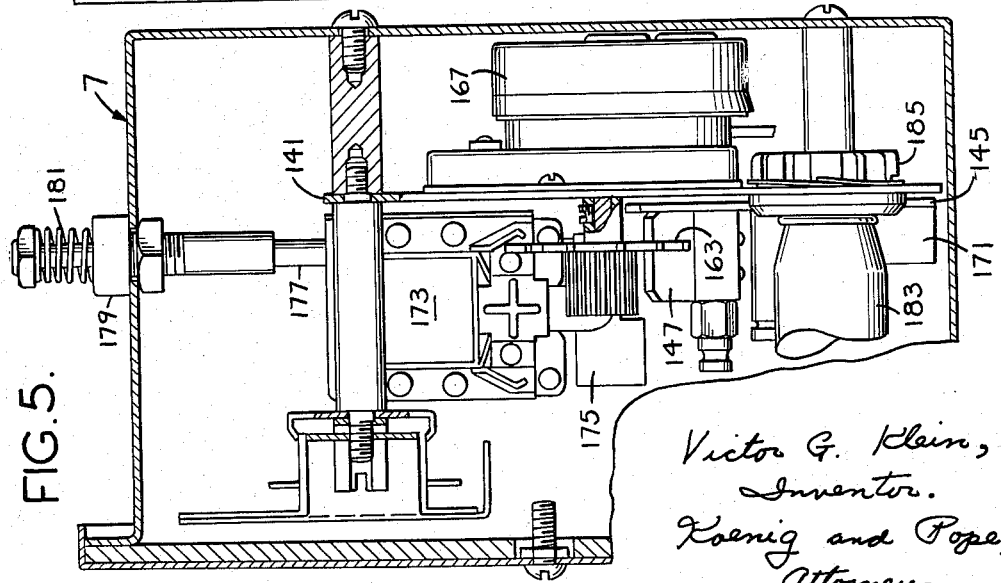

United States Patent Office 2,960,185
Patented Nov. 15, 1960

2,960,185

LUBRICATING APPARATUS

Victor G. Klein, Defiance, Mo., assignor to The McNeil Machine & Engineering Company, Akron, Ohio, a corporation of Ohio Filed Jan. 30, 1959, Ser. No. 790,144

19 Claims. (Cl. 184—7)

This invention relates to lubricating apparatus, and more particularly to apparatus for automatically periodically actuating and charging lubricant injectors in a lubricating system of the type wherein various points of lubrication of a machine are to receive measured charges of lubricant from the injectors at periodic intervals.

The invention is particularly concerned with lubricating apparatus comprising a pump for pumping lubricant from a source and delivering it under pressure through an injector supply line to a plurality of lubricant injectors which may be of the type such as shown, for example, in U.S. Patents 2,448,583 and 2,637,413. Such injectors are adapted to deliver measured charges of lubricant upon development of a predetermined pressure in the injector supply line, this pressure being referred to as injector-cycling pressure, and require relief of pressure in the supply line in order to reset and reload for the next cycle. An electric motor is provided for driving the pump. The motor is intermittently periodically actuated to drive the pump, thereby to develop pressure in the injector supply line. Pressure is built up to the point where the injectors operate to deliver their measured charges of lubricant. The motor and pump continue in operation and the pressure continues to increase until it reaches a peak at which the motor is stopped to stop the pump, and the injector supply line is vented to relieve the pressure therein to enable the injectors to reset and reload.

Among the several objects of the invention may be noted the provision of lubricating apparatus of the class described in which the operation of the electric motor is under control of a switch, with means for actuating the switch at periodic intervals to start the motor, and means responsive to increase of pressure in the system to a value above injector-cycling pressure for immediately stopping the motor and the pump, the system then being vented to enable the injectors to reset and reload; the provision of lubricating apparatus of this class adapted automatically to stop the motor if the pump should fail to develop sufficient pressure to stop the motor in a reasonable time, as may occur if the supply of lubricant should be exhausted or if there should be a break in the supply line; the provision of lubricating apparatus of this class adapted to actuate an alarm in the event of lubricant failure; the provision of lubricating apparatus of this class in which provision is made for manual operation at any time and in which provision is also made for operation each time the machine is started; and the provision of lubricating apparatus such as described which is reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a plan view of a lubricating apparatus of this invention, with parts broken away and shown in section;

Fig. 3 is a vertical cross section on an enlarged scale taken on line 3—3 of Fig. 1, parts being broken away;

Fig. 4 is an enlarged cross section taken on line 4—4 of Fig. 1, with parts further broken away and shown in section;

Fig. 5 is a vertical section taken on line 5—5 of Fig. 4, parts being broken away;

Fig. 6 is an enlarged fragment of Fig. 3 with parts broken away and shown in section;

Fig. 7 is an enlarged detailed section taken on line 7—7 of Fig. 4;

Fig. 8 is a fragment of Fig. 4 with parts broken away and shown in section and showing parts in a moved position; and, Fig. 9 is a wiring diagram.

Corresponding reference characters indicate corresponding parts throughout the several views of the drawings.

Figure 1:
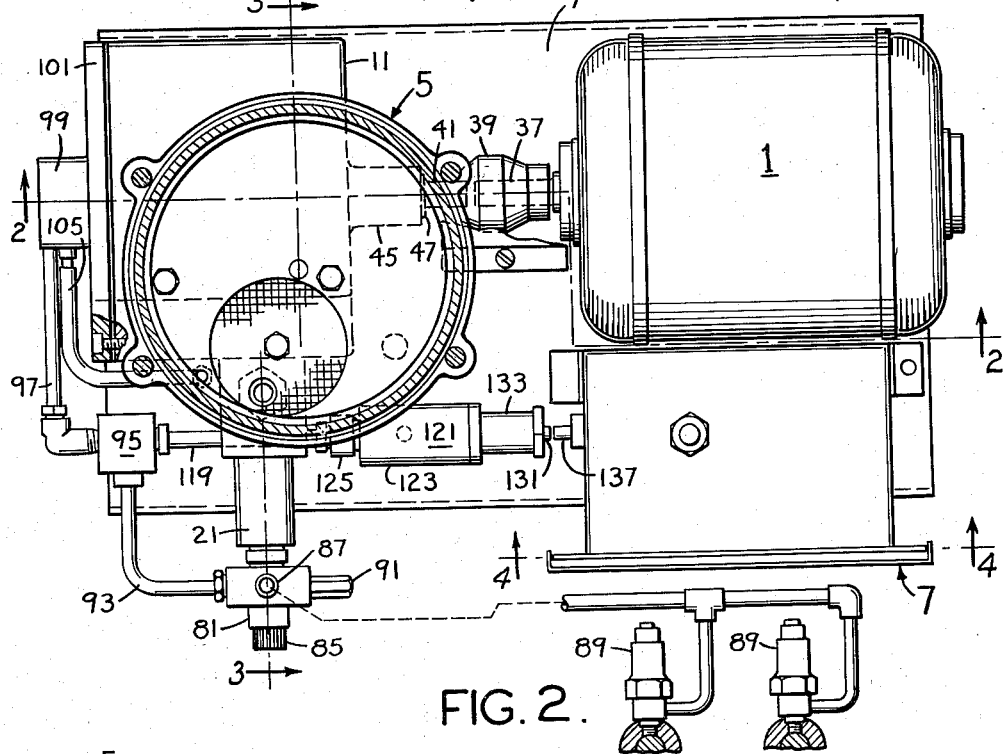

Referring to the drawings, a lubricating system of this invention is shown to comprise a motor 1, a pumping mechanism 3, a reservoir 5 for lubricant to be pumped, and a box 7 containing electrical control elements to be described. These components are shown as mounted on a base 9.

The pumping mechanism 3 comprises a gear box 11 having a lateral hole 13 in which is threaded a pump cylinder 15. The gear box has an integral tubular boss 17 extending laterally outward therefrom and surrounding the pump cylinder 15, with a space 19 therebetween forming an annular intake manifold around the pump cylinder. The pump cylinder has an enlarged-diameter extension 21 with a shoulder 23 engaging packing 25 to seal the outer end of the manifold 19. The pump cylinder 15 is formed with radial ports 27 for intake of lubricant from the manifold 19. Lubricant is supplied to the manifold from the reservoir 5, which is supported on top of the gear box 11, by means of a connection such as indicated at 29. Where the lubricant is grease, a spring-pressed follower 31 is provided in the reservoir for forcing grease to the pump. Where the lubricant is a fluid lubricant, the follower 31 may be omitted.

Figure 2:
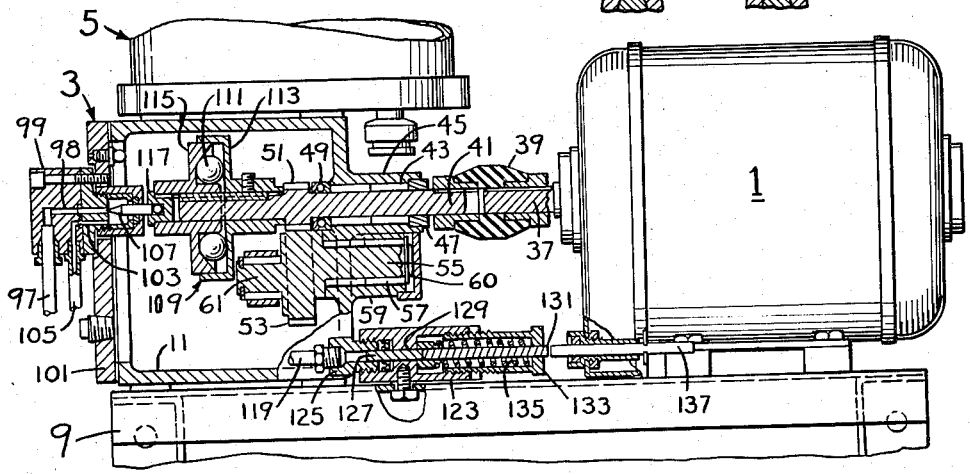
Fig. 2 is a vertical cross section taken essentially on line 2—2 of Fig. 1, but also showing in section a pressure control located forward of line 2—2.

A pump plunger 33 is adapted to reciprocate in the pump cylinder 15 away from and back to a retracted position wherein the cylinder ports 27 are open for entry of lubricant into the cylinder from the intake manifold 19. Fig. 3 shows the pump plunger in its retracted position. The pump plunger 33 is adapted to be reciprocated by mechanism indicated generally at 35 in the gear box 11 driven by the motor 1. As shown in Fig. 2, the shaft 37 of the motor 1 is coupled as indicated at 39 to a drive shaft 41 journalled in a roller bearing 43 in a tubular boss 45 on the gear box. A seal for the shaft 41 is indicated at 47. A thrust bearing for the shaft is indicated at 49. The shaft is formed to provide a pinion gear 51 intermediate its ends. This meshes with a gear 53 having a stub shaft 55 journalled in a roller bearing 57 in another tubular boss 59 on the gear box 11. A seal for the stub shaft is indicated at 60. Gear 53 carries a crank pin 61. A connecting rod 63 (see Fig. 3) has one end connected as indicated at 65 to the crank pin 61 and its other end connected by a universal joint 67 to the inner end of the pump plunger 33 within the gear box.

Threaded in the extension 21 of the pump cylinder 15 is an outlet check valve assembly generally designated 69. As shown in detail in Fig. 6, this outlet check valve assembly comprises a check valve body 71 containing two identical valve seats 73 and two identical conical check valves 75 each of which is biased by a spring 77 toward its respective seat. The valve seats, the valves and the springs are retained in the valve body 71 by a cap 79 threaded in the outer end of the body 71. Threaded in the cap 79 is an outlet bolt 81 carrying an outlet connector 83. Threaded in the outer end of the outlet bolt is an air vent screw 85 adapted to be backed off for venting air from the system. The outlet connector 83 has three outlets. Into one of these is connected a lubricant line 87 for supplying a plurality of injectors 89, of the type previously mentioned. These injectors are adapted to dispense measured charges of lubricant upon increase of pressure in the line 87 to an injector-cycling value, and to reset and reload with measured charges of lubricant upon relief of pressure in the line 87. Into another of the outlets is connected a safety unloader 91, i.e., a conventional safety valve adapted to blow off at a predetermined pressure to relieve excessive injector supply line pressure. This safety unloader may be preset to open, for example, at 1600 p.s.i. maximum, 1400 p.s.i. minimum. The injectors may cycle at 400 p.s.i.–500 p.s.i., for example. In such case, venting may be effected when the pressure in the line 87 reaches approximately 1000 p.s.i., for example. If for some reason, the system should not vent at 1000 p.s.i., then the safety unloader will blow off the system if the pressure reaches 1400 p.s.i.–1600 p.s.i. Into the third of the outlets in the outlet connector 83 is connected a line 93 which leads to a junction block 95 on the base 9.

A vent line 97 leads from the junction block 95 to the inlet port 98 of a vent valve body 99 mounted on a removable end plate 101 of the gear box 11. The valve body 99 has an outlet 103, and a vent line 105 extends from this outlet back to the reservoir 5. Flow from the inlet to the outlet is controlled by a needle vent valve 107 actuated by a centrifugal control 109 on the shaft 41. As shown in Fig. 2, this centrifugal control 109 comprises a plurality of balls 111 retained between a ball retainer 113 fixed on the shaft 41 and a cam member 115 splined on the shaft 41 for axial movement thereon. The cam member 115 carries a thrust bearing 117 for the needle vent valve 107, the arrangement being such that when the motor 1 is started and drives the shaft 41, the vent valve 107 closes off the inlet port 98 in the vent valve body 99. When the motor stops, the vent valve 107 is free to open.

A control line 119 leads from the junction box 95 to a pressure control 121. As shown in Fig. 2, this pressure control comprises a body 123 fixed on the base. A tube connector 125 for connection of the line 119 is threaded in one end of the body. A pressure-responsive pin 127 is slidable in the tube connector and in an axial opening 129 in the body 123. The pin 127 is engageable with a rod 131 slidable in a spring housing 133 threaded in the other end of the body 123. A spring 135 in the spring housing 133 biases the rod 131 and the pin 127 toward the left as viewed in Fig. 2 to the retracted position shown in Figs. 1 and 2. The right end of the rod 131 extends through a hole in the end of the spring housing 133 for engagement with a slidable motor switch control rod 137 which is furnished as part of the control box 7. The arrangement is such that when pressure in lines 87, 93 and 119 increases above a predetermined value (1000 p.s.i., for example) the pin 127 and rod 131 are driven to the right from their Fig. 2 retracted position to drive the rod 137 to the right. When the pressure in lines 87, 93 and 119 is relieved, the spring 135 returns the rod 131 and the pin 127 toward the left to their retracted position.

In the control box 7 is a vertical panel 141 (see Figs. 4 and 5). Pivoted at 143 on the front of this panel is a plate 145 on which is mounted a control switch 147 for the motor 1. This switch is a snap-acting type of switch having an ON button 149 projecting from the top of the switch case and engageable by an actuator constituted by a leaf spring arm 151 fastened at one end to the top of the case, and further having an OFF button or actuator 153 projecting from the bottom of the case. When button 149 is pushed in, button 153 is moved out, and the switch is closed and remains closed until button 153 is pushed in. Then when button 153 is pushed in to open the switch, button 149 is moved out. The switch-carrying plate 145 has a hole 155 (see Figs. 7 and 8) to the left of the pivot 143. A stud 157 extends from the panel 141 through this hole. Adjustably threaded in one side of the stud on the outside of the plate 145 is a screw 159 which constitutes a fixed abutment engageable by the OFF button 153 of the switch 147. The stud 157 has a reduced portion within the hole 155 which is smaller than the hole 155 to allow the plate 145 to swing between the operative position in which it is shown in Fig. 4, and the retracted position in which it is shown in Fig. 8. The swinging of the plate is limited by the stud 157. The plate is biased to swing clockwise as viewed in Fig. 4 toward its operative position by a spring 161.

When the plate 145 is in its Fig. 4 operative position, the switch 147 is positioned for engagement of the free end of the switch-actuating arm 151 by the lobes of a cam 163. This cam has a shape similar to that of a ratchet. It is fixed on the output shaft 165 of an electric clock motor 167 (see Fig. 5) adapted to rotate the cam at the rate of one revolution per hour, for example. The clock motor 167 is mounted on the back of the panel 141. As shown, the cam 163 has twelve equally spaced lobes 169, similar to the teeth of a ratchet, thereby being capable of actuating the switch arm 151 once every five minutes (assuming that the cam 163 rotates one revolution per hour). When the plate 145 swings to its retracted position of Fig. 8, the free end of the switch actuating arm 151 is carried away and disengaged from the cam 163 to be clear of the lobes 169 thereon. Also, when the plate 145 swings to the retracted position, the switch 147 is carried around in such manner that its OFF button 153 engages the screw 159 projecting up from the stud 157, and the OFF button is thereupon driven upward to open the switch 147. The switch-carrying plate 145 has an outwardly bent ear 171 which is engageable by the rod 137. When the rod 137 is driven to the right by the pressure control 121, the plate 145 is swung counterclockwise on its pivot 143 away from its operative position of Fig. 4 to its retracted position of Fig. 8 against the return bias of the spring 161.

A solenoid 173 is mounted on the panel 141 above the switch-actuating arm 151. This solenoid has a weighted plunger 175. When the solenoid is energized, the plunger 175 is raised clear of the switch arm 151. When the solenoid is deenergized, the plunger 175 drops down on the switch arm 151 to close the switch 147 (assuming that the plate 145 and switch 147 are in the Fig. 4 operative position). A push rod 177 is slidable in a guide 179 in the top of the control box 7, the lower end of this rod being engageable with the switch-actuating arm 151 for manually closing the switch 147 at any time. A spring 181 biases the rod 177 to a raised retracted position. A time delay relay 183 is mounted as indicated at 185 on the panel 141 extending forward from the panel. A terminal support 187 is mounted as indicated at 189 extending in front of the upper portion of the control panel 141. This terminal support carries seven terminal strips designated T1 to T7.

Figure 9:
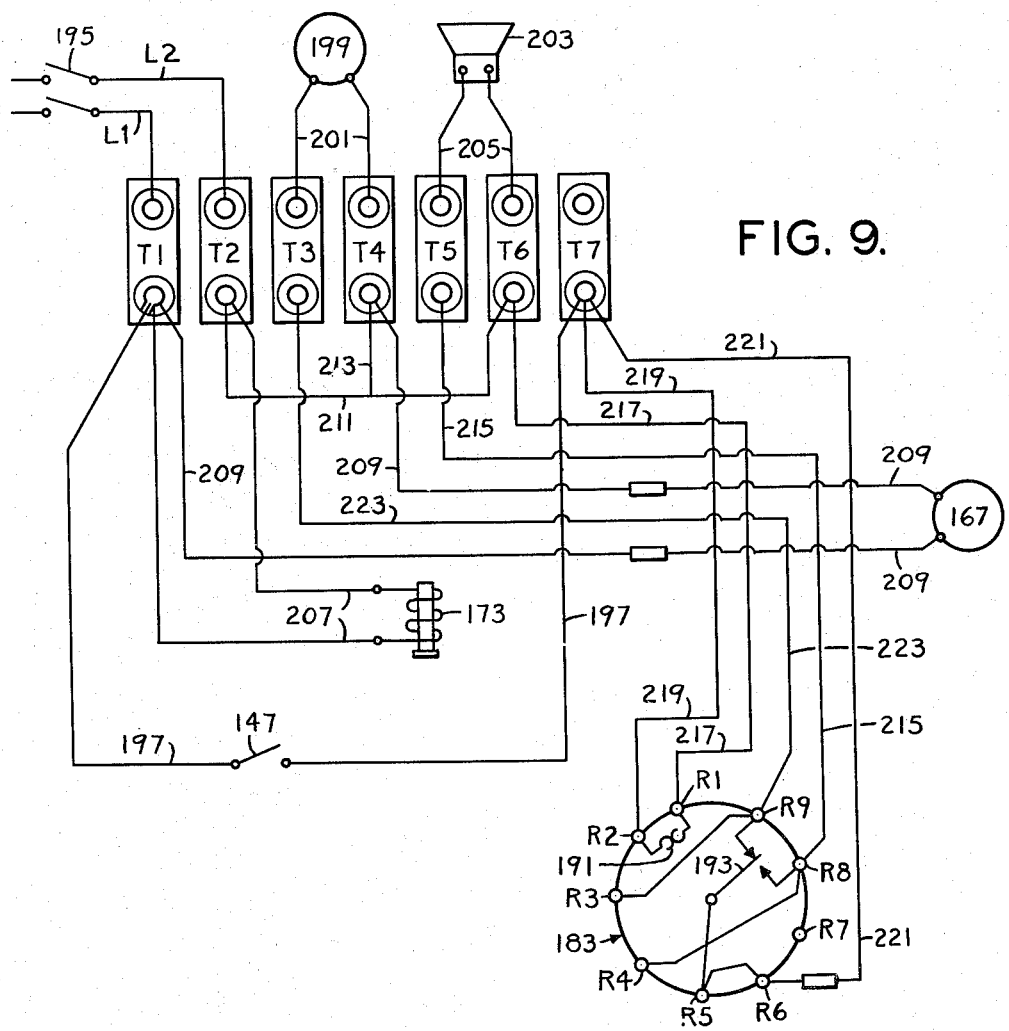

The time delay relay 183 is a thermal time delay relay of a known type such as illustrated in Fig. 9. It has nine terminals designated R1 to R9. It includes a heating element 191 connected between terminals R1 and R2 controlling a double-throw thermostatic switch 193. This switch normally establishes a circuit between terminals R5 and R9. If current flows through the heating element 191 for more than the time delay period of the relay, the switch 193 is actuated to break the circuit between terminals R5 and R9 and establish a circuit between terminals R5 and R8. The time delay period of the relay is somewhat longer than the time normally taken by the pump to develop the pressure required for actuating the pressure control 121. For example, if the pump normally takes twenty seconds to develop the pressure required to actuate the pressure control 121 (1000 p.s.i., for example), then the time delay period of the relay may be one minute. Terminal R3 is connected to terminal R9, terminal R4 is connected to terminal R8, and terminal R5 is connected to terminal R6.

Power lines L1 and L2 are shown in Fig. 9 to be connected to the terminal strips 1 and 2, respectively. A power line switch is indicated at 195. The motor switch 147 is connected in a line 197 between the terminal strips T1 and T7. A starter 199 for the motor 1 is connected in a line 201 between the terminal strips T3 and T4. An electrically actuated alarm 203, which may be a lamp, a horn or a buzzer, for example, is connected in a line 205 between the terminal strips T5 and T6. The solenoid 173 is connected in a line 207 between the terminal strips T1 and T2. The clock motor 167 is connected in a line 209 between the terminal strips T1 and T4. A line 211 is connected between terminal strips T2 and T6 with a connection 213 between line 211 and terminal strip T4. A line 215 is connected between terminal strip T5 and terminal R8 of the time delay relay 183. A line 217 is connected between terminal strip T6 and terminal R1 of the relay. Lines 219 and 221 are connected between terminal strip T7 and terminals R2 and R6 of the relay. A line 223 is connected between terminal strip T3 and terminal R9 of the relay.

Operation is as follows:

Assuming that the line switch 195 is closed, the solenoid 173 is energized and its plunger 175 is raised from the motor switch actuating arm 151. This condition is maintained as long as the line switch is closed. The clock motor 167 is energized and drives the cam 163 continuously at the rate of one revolution per hour. The cam rotates continuously as long as the line switch is closed. The switch-carrying plate 145 being in its Fig. 4 operative position, ultimately one of the lobes 169 on the cam 163 will come into engagement with the free end of the switch-actuating arm 151 to close the switch 147. With switch 147 closed, the motor starter 199 is energized to initiate operation of the motor 1. The circuit for the motor starter is established from line L1 via lines 197 and 221, the connection between terminals R6 and R5 of the relay, the circuit in the relay between terminals R5 and R9, line 223, terminal strip T3, line 201, terminal strip T4 and lines 213 and 211. A circuit for the relay heater 191 is established from terminal strip T7 via lines 219 and 217 to terminal strip T6 and thence via line 211.

With the motor 1 in operation, the centrifugal vent valve 107 is closed to allow pressure to build up in the system. The pump plunger 33 is driven to deliver lubricant under pressure into the injector supply line 87 and to the pressure control 121 via lines 93 and 119. When the pressure in line 87 builds up to injector-cycling value (400 p.s.i.–500 p.s.i., for example), the injectors 89 operate to deliver their measured charges of lubricant. Pressure continues to build up in lines 87, 93 and 119. When it reaches 1000 p.s.i., for example, the pressure control 121 is actuated to drive rod 137 to the right from its Fig. 4 position, thereby swinging the switch-carrying plate 145 and the switch 147 to their Fig. 8 retracted position. The OFF button 149 of the switch 147 engages the screw 159 and switch 147 is thereby opened. The free end of the switch-actuating arm 151 is carried away from the cam 163 clear of the lobes on the cam to permit the opening of the switch.

With the switch 147 open, the motor starter 199 is deenergized and the motor 1 and the pumping mechanism 3 stop. Centrifugal vent valve 107 thereupon opens to vent the injector supply line 87 and the pressure control 121 back to the reservoir 5. Venting of line 87 permits the injectors 89 to reset and reload for the next cycle of operation. Venting of the pressure control 121 permits the switch-carrying plate 145 and switch 147 to swing back to the Fig. 4 operative position in which the free end of the switch-actuating arm 151 is in position for engagement by the next lobe on cam 163. The venting occurs rapidly upon attainment of the 1000 p.s.i. pressure required for actuation of the pressure control, so that the system is not subjected to pressure for any prolonged period of time. When the next lobe on cam 163 engages the switch-actuating arm 151, the operation is repeated, and thus, with twelve lobes on the cam and with the cam rotating at one revolution per hour, the injectors 89 are cycled every five minutes.

The above described operations ensue as long as the pressure control 121 is actuated within the one minute time delay interval established by the time delay relay 183. If for some reason, the 1000 p.s.i. pressure required to actuate the pressure control should not be developed in one minute, the heater 191 of the time delay relay will heat up to the point where the thermostatic switch 193 of the relay is thrown over to break the circuit between terminals R5 and R9 of the relay and make the circuit between relay terminals R5 and R8. Accordingly, the circuit for the motor starter 199 is broken, and the motor 1 stops. Conditions which may result in such failure include emptying of the reservoir 5 or a break in the line 87. When the circuit between relay terminals R5 and R8 is completed, the alarm 203 is energized, the circuit therefor being established from terminal strip 1 via line 197 (switch 147 being closed), line 221, relay terminal R6 to relay terminal R5 and thence to relay terminal R8, line 215 to terminal strip T5, line 205, terminal strip T6, and line 211. The alarm remains energized until the line switch 195 is opened.

When the machine which is lubricated by the injectors 89 is shut off at the end of a work period, the line switch 195 is opened. The solenoid 173 is thereupon deenergized and the weighted plunger 175 drops down onto the switch-actuating arm 151 to close the switch 147. When the machine is started at the beginning of the next work period, the line switch 195 is closed. The solenoid 173 is thereby energized to raise the plunger 175 from the arm 151, but the switch 147 remains closed and the lubricating apparatus operates in the same manner as when switch 147 is closed by the cam 163. Thus, the injectors are cycled each time the machine is started. The injectors 89 may be manually cycled at any time independently of the cam 163 by pushing down the rod 177 to close the switch 147.

As above described, the cam 163 has twelve equally spaced lobes and rotates at the rate of one revolution per hour for cycling the apparatus once every five minutes. The frequency of the cycles may be changed by using cams with different numbers of lobes. For example, a six-lobe cam may be used for cycling the apparatus once every ten minutes. Extra cams with different numbers of lobes may be supplied, or the twelve-lobe cam (made of sheet metal) may be reworked by breaking off a number of lobes.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Lubricating apparatus comprising a pump, an electric motor for driving the pump, said motor being connected in an electric circuit including a switch for controlling the operation of the motor, means for periodically engaging the switch for actuating it to start the motor and the pump, said switch and said means being relatively movable for disengagement of one from the other, and means responsive to pressure developed by the pump for disengaging said switch and said switch-actuating means and for actuating the switch to stop the motor and pump upon increase of pressure to a predetermined value.

2. Lubricating apparatus as set forth in claim 1 wherein the pump is adapted normally to develop said predetermined value of pressure within a certain time, and wherein means is provided in said circuit for stopping the motor in response to operation of the motor for a longer time.

3. Lubricating apparatus as set forth in claim 1 wherein the pump is adapted normally to develop said predetermined value of pressure within a certain time, and wherein means is provided in said circuit for actuating an alarm in response to operation of the motor for a longer time.

4. Lubricating apparatus as set forth in claim 1 wherein the pump is adapted normally to develop said predetermined value of pressure within a certain time, and wherein means is provided in said circuit for stopping the motor and actuating an alarm in response to operation of the motor for a longer time.

5. Lubricating apparatus as set forth in claim 1 wherein means is provided for manually actuating the switch to start the motor at any time.

6. Lubricating apparatus as set forth in claim 1 wherein said circuit is adapted for energization by a power line including a line switch, and wherein means is provided for actuating said motor-controlling switch to start the motor each time the line switch is closed.

7. Lubricating apparatus comprising a pump, an electric motor for driving the pump, said motor being connected in an electric circuit including a switch for controlling the operation of the motor, means for periodically closing the switch to start the motor and the pump, said switch being mounted for movement toward and away from an operative position in which it is engageable by said switch-closing means, and means responsive to pressure developed by the pump for moving the switch away from its operative position to disengage it from said switch-closing means and for opening the switch to stop the motor and pump upon increase of pressure to a predetermined value.

8. Lubricating apparatus as set forth in claim 7 wherein the pump is adapted normally to develop said predetermined value of pressure within a certain time, and wherein means is provided in said circuit for stopping the motor in response to operation of the motor for a longer time.

9. Lubricating apparatus as set forth in claim 7 wherein the pump is adapted normally to develop said predetermined value of pressure within a certain time, and wherein means is provided in said circuit for actuating an alarm in response to operation of the motor for a longer time.

10. Lubricating apparatus as set forth in claim 7 wherein the pump is adapted normally to develop said predetermined value of pressure within a certain time, and wherein means is provided in said circuit for stopping the motor and actuating an alarm in response to operation of the motor for a longer time.

11. Lubricating apparatus as set forth in claim 7 wherein means is provided for manually actuating the switch to start the motor at any time.

12. Lubricating apparatus as set forth in claim 7 wherein said circuit is adapted for energization by a power line including a line switch, and wherein means is provided for actuating said motor-controlling switch to start the motor each time the line switch is closed.

13. Lubricating apparatus comprising a pump, a reservoir containing a supply of lubricant for the pump, an electric motor for driving the pump, said pump having an outlet and adapted to supply lubricant under pressure through the outlet to a plurality of lubricant injectors, said injectors being adapted to deliver measured charges of lubricant upon development of injector-cycling pressure by the pump and to reset and reload upon relief of pressure, means for venting the pump outlet back to the reservoir in response to stopping of the pump, said motor being connected in an electric circuit including a switch for controlling the operation of said motor, said switch having a first actuator for closing it to start the motor and a second actuator for opening it to stop the motor, a movable support for the switch normally occupying an operative position, a rotatable cam adapted periodically to engage said first actuator when said support is in operative position, a second electric motor adapted continuously to drive the cam, a pressure control responsive to pressure developed by the pump adapted to move said support away from its operative position to a retracted position wherein the first actuator is clear of the cam when the pressure developed by the pump reaches a value higher than injector-cycling pressure, and means engageable by the second switch actuator when the support moves away from its operative position to move said second actuator to open the switch to stop the first-mentioned motor.

14. Lubricating apparatus as set forth in claim 13 wherein the pump is adapted normally to develop said predetermined value of pressure within a certain time, and wherein operation of the first-mentioned motor is under control of a time delay relay in said circuit adapted to stop the motor in response to operation of the motor for a longer time.

15. Lubricating apparatus as set forth in claim 14 further comprising an alarm under control of the relay in said circuit, said relay acting to energize the alarm concurrently with the stopping of the first-mentioned motor by the relay.

16. Lubricating apparatus as set forth in claim 13 further comprising manually operable means for engaging said first actuator when said support is in operative position to start the first-mentioned motor at any time.

17. Lubricating apparatus as set forth in claim 13 wherein said circuit is adapted for energization by a power line including a line switch, and wherein a solenoid is provided for engaging said first actuator, said solenoid being energized in response to closing of the line switch and thereupon being retracted from said first actuator, said solenoid acting to engage said first actuator upon being deenergized.

18. Lubricating apparatus comprising a pump, a reservoir containing a supply of lubricant for the pump, an electric motor for driving the pump, said pump having an outlet and adapted to supply lubricant under pressure through the outlet to a plurality of lubricant injectors, said injectors being adapted to deliver measured charges of lubricant upon development of injector-cycling pressure by the pump and to reset and reload upon relief of pressure, means for venting the pump outlet back to the reservoir to relieve the pressure including a vent valve and centrifugal means operable when the pump is in operation for holding the vent valve closed, said vent valve being adapted to open when the pump is stopped, said motor being connected in an electric circuit including a switch for controlling the operation of said motor, said switch having a first actuator for closing it to start the motor and a second actuator for opening it to stop the motor, a pivoted support for the switch, a spring biasing the support to swing to an operative position, a rotatable cam having at least one lobe adapted periodically to engage said first actuator when said support is in operative position, an electric time clock motor adapted continuously to drive the cam, a pressure control responsive to pressure developed by the pump adapted to swing said support away from its operative position to a retracted position wherein the first actuator is clear of the cam when the pressure developed by the pump reaches a value higher than injector-cycling pressure, and means engageable by the second switch actuator when the support swings away from its operative position to move said second actuator to open the switch to stop the first-mentioned motor.

19. Lubricating apparatus comprising a reciprocating pump, a reservoir containing a supply of lubricant for the pump, an electric motor, a shaft driven by said motor, means for driving the pump from said shaft, said pump having an outlet and adapted to supply lubricant under pressure through the outlet to a plurality of lubricant injectors, said injectors being adapted to deliver measured charges of lubricant upon development of injector-cycling pressure by the pump and to reset and reload upon relief of pressure, means for venting the pump outlet back to the reservoir to relieve the pressure including a vent valve and centrifugal means on said shaft operable when the pump is in operation for holding the vent valve closed, said vent valve being adapted to open when the pump is stopped, said motor being connected in an electric circuit including a switch for controlling the operation of said motor, said switch having a first actuator for closing it to start the motor and a second actuator for opening it to stop the motor, a pivoted support for the switch, a spring biasing the support to swing to an operative position, a rotatable cam having a plurality of lobes adapted successively and periodically to engage said first actuator when said support is in operative position, an electric time clock motor adapted continuously to drive the cam, a pressure control responsive to pressure developed by the pump adapted to swing said support away from its operative position to a retracted position wherein the first actuator is clear of the lobes on the cam when the pressure developed by the pump reaches a value higher than injector-cycling pressure, and a fixed abutment engageable by the second switch actuator when the support swings away from its operative position to move said second actuator to open the switch to stop the first-mentioned motor.

References Cited in the file of this patent

UNITED STATES PATENTS

| | | |
|---|---|---|
| 2,206,335 | Rotter et al. | July 2, 1940 |
| 2,521,615 | Walker | Sept. 5, 1950 |
| 2,616,523 | Davis | Nov. 4, 1952 |